(12) United States Patent
Williams et al.

(10) Patent No.: US 9,725,970 B1
(45) Date of Patent: Aug. 8, 2017

(54) COMPACT PIPE HANDLING TRAILER

(71) Applicant: CRW Contracting, Inc., Stephenville, TX (US)

(72) Inventors: Chris R. Williams, Stephenville, TX (US); Garry Payne, Midland, TX (US)

( * ) Notice: Subject to any disclaimer, the term of this patent is extended or adjusted under 35 U.S.C. 154(b) by 0 days.

(21) Appl. No.: 14/489,422

(22) Filed: Sep. 17, 2014

Related U.S. Application Data

(60) Provisional application No. 61/879,642, filed on Sep. 18, 2013.

(51) Int. Cl.
*E21B 19/15* (2006.01)
*E21B 19/14* (2006.01)
*B60S 9/12* (2006.01)

(52) U.S. Cl.
CPC ............... *E21B 19/14* (2013.01); *B60S 9/12* (2013.01)

(58) Field of Classification Search
CPC ........ E21B 19/155; E21B 19/14; E21B 19/00; E21B 19/15
USPC ........... 212/301, 302, 304; 414/22.51–22.59, 414/22.61–22.65, 555, 745.4–745.9, 414/746.1–746.3, 746.5–746.6
See application file for complete search history.

(56) References Cited

U.S. PATENT DOCUMENTS

| 2,226,947 | A | | 12/1940 | Sheldon |
| 2,503,516 | A | | 4/1950 | Shrewsbury |
| 2,615,585 | A | | 10/1952 | Menhall |
| 2,787,342 | A | | 4/1957 | Jenkins et al. |
| 2,958,538 | A | * | 11/1960 | Norris ................ B60P 1/6427 212/304 |
| 3,443,647 | A | | 5/1969 | Jenkins et al. |
| 3,650,339 | A | | 3/1972 | Selfe et al. |
| 4,081,087 | A | | 3/1978 | Freeman, Sr. |
| 4,235,566 | A | | 11/1980 | Beeman |
| 4,357,129 | A | * | 11/1982 | Luttig .................... B60F 1/00 105/215.2 |

(Continued)

FOREIGN PATENT DOCUMENTS

| DE | WO 0142618 A1 * | 6/2001 | ........... E21B 19/155 |
| EP | 1502000 B1 | 1/2008 | |

(Continued)

OTHER PUBLICATIONS

Canrig Automated Power Catwalk. pp. 1-4.

(Continued)

*Primary Examiner* — Gregory Adams
(74) *Attorney, Agent, or Firm* — Shiells Law Firm P.C.; Theodore F. Shiells

(57) ABSTRACT

The invention provides a compact pipe handling trailer for a drilling or service rig. The pipe handling trailer includes a deck having a raised frame and an extended horizontal frame. A trough is pivotally housed within the extended horizontal frame, the trough having a first end and a second end. A first piston/cylinder assembly is operably coupled to the first end of the trough; a second piston/cylinder assembly is operably coupled proximal to the second end of the trough. An operating means for the pipe handling trailer is provided within the raised frame of the deck. The pipe handling trailer is transportable and is attached to a trailer on a common axle. A number of retractable downriggers are provided on the deck to position the pipe handling trailer firmly to the ground.

21 Claims, 10 Drawing Sheets

(56) References Cited

U.S. PATENT DOCUMENTS

| | | | |
|---|---|---|---|
| 4,365,692 A | 12/1982 | Craig et al. | |
| 4,386,883 A * | 6/1983 | Hogan | E21B 19/155 414/22.61 |
| 4,445,588 A * | 5/1984 | Truninger | B66C 23/62 180/233 |
| 4,547,110 A | 10/1985 | Davidson | |
| 4,684,314 A * | 8/1987 | Luth | B60P 1/025 104/45 |
| 5,628,607 A * | 5/1997 | Kyzer | B60P 1/02 280/43.23 |
| 6,877,942 B2 * | 4/2005 | Eastcott | E21B 19/155 414/22.54 |
| 7,021,880 B2 * | 4/2006 | Morelli | E21B 19/15 414/22.59 |
| 7,163,367 B2 * | 1/2007 | Handley | E21B 19/155 405/166 |
| 7,473,065 B2 * | 1/2009 | Wells | E21B 19/155 414/22.57 |
| 7,568,533 B2 * | 8/2009 | Felt | E21B 19/155 175/52 |
| 7,600,585 B2 | 10/2009 | Patton et al. | |
| 8,052,368 B2 | 11/2011 | Littlewood | |
| 8,210,269 B2 * | 7/2012 | Hudson | E21B 19/06 166/380 |
| 2006/0104746 A1 * | 5/2006 | Thompson | E21B 19/155 414/22.54 |
| 2008/0263990 A1 * | 10/2008 | Morelli | E21B 19/14 52/650.3 |
| 2009/0053013 A1 | 2/2009 | Maltby | |
| 2009/0127001 A1 * | 5/2009 | Felt | E21B 19/155 175/85 |
| 2009/0252576 A1 * | 10/2009 | Gerber | E21B 19/00 414/22.54 |
| 2010/0038088 A1 | 2/2010 | Springett et al. | |
| 2011/0226466 A1 * | 9/2011 | Funes | E21B 15/00 166/85.1 |
| 2011/0232971 A1 | 9/2011 | Harmon | |
| 2012/0121364 A1 | 5/2012 | Taggart et al. | |

FOREIGN PATENT DOCUMENTS

| | | |
|---|---|---|
| WO | WO 2006/059910 A1 | 9/2001 |
| WO | WO 2007/149507 A3 | 12/2007 |

OTHER PUBLICATIONS

Hercules Drilling Rig Catwalk. pp. 1-2.
North Rig Catwalk Technologies. p. 1.
National Oilwell Varco Catwalk Machines. pp. 1-2.

* cited by examiner

COMPACT PIPE HANDLING TRAILER

FIELD OF INVENTION

The invention generally relates to equipment used for operations at oil and gas rigs and particularly to a trailer incorporating a pipe handling machine for installing and removing pipes at an oil rig.

BACKGROUND OF THE INVENTION

Drilling or service rigs employ pipe or tube casings when drilling an oil well. The pipes need to be delivered to, or removed from, the mouth of the drilling rig in succession. Rig floor heights are determined by various safety devices attached to the top of the oil well and require some means of getting pipe from the ground to vertical inside the derrick of a rig. Manual lifting and positioning of the pipe onto the mouth of the drilling rig is time consuming and requires enormous utilization of manpower. To overcome this difficulty, there have been machines and apparatuses known to exist in the prior art that at least partially automate the delivery of the pipe or tube casings onto the drilling or service rig. One such apparatus is disclosed in U.S. Pat. No. 4,235,566 granted to Beeman et. al., which discloses a pipe-conveying catwalk. The pipe-conveying catwalk has a ramp affixed to the floor of a drilling rig and a main frame that is ground supported adjacent to a pipe rack so that pipe can be conveyed between the rack and the derrick (or rig) floor. Pipe is rolled from the rack into a trough which forms part of a stinger. The stinger is nested within a boom and can be telescoped to extend longitudinally away from the boom. The boom is retracted into nested position within the main framework. One end of the boom is attached to the main frame by an extensible swing arm apparatus which elevates the outer end of the boom while the other end of the main frame is attached to the rig floor by a ramp which moves the other end of the boom from the nested position vertically upwards and towards the rig floor. A pipe is rolled from the pipe rack into the trough, the boom is elevated into an inclined position such that the stinger telescopes from the boom to position the box end of the pipe in overlying relationship respective to the derrick floor. Roughnecks can then pick the pipe vertically upward into the drilling rig and attach the pipe joint to the pipe string located in a borehole. When coming out of the hole, the opposite procedure is involved in order to transport the pipe from the rig floor back onto the pipe rack. The pipe conveying catwalk of Beeman's patent is a permanent structure fixed to the rig floor. The pipe conveying is predominantly through a boom connected to the catwalk.

A US Patent Application bearing number 20100068006 filed in the name of Richard Littlewood discloses a catwalk for a drilling rig. The pipe handling catwalk includes a deck having an upper surface, a first end, an opposite end and a tubular support surface on the upper surface, the tubular support surface being elongate and extending between the first end and the opposite end. A deck guide including a wall extending up from the deck upper surface and drivable along tubular support surface of the deck is provided. A ramp is mounted on the deck adjacent its first end and positionable extending at an angle from the deck. A carrier is connected to the ramp to remain on the ramp and is moveable such that an end thereof can be lifted away from the ramp to reduce the inclination of the carrier relative to the angle of the ramp, the carrier including an upper surface and a tubular retaining surface thereon extending along the carrier substantially in line with the tubular support surface of the deck. Littlewood's application provides a two stage pipe handling catwalk. Further the apparatus has to be permanently fixed adjacent to the drilling rig. The inclination of the ramp with respect the deck is also fixed.

U.S. Pat. No. 4,684,314 assigned to Weatherford/Lamb Inc discloses a pipe handling apparatus. The pipe handling apparatus is adapted for transferring oil well pipe to and from a drilling rig. The apparatus includes a transportable chassis having tracks for supporting and guiding a reciprocable and rotatable table. A first scissors lift mounted to the table provides vertical motion to a platform to which is mounted a second scissors lift. The second scissors lift is designed to impart vertical and horizontal motion to a conveyor. The conveyor comprises three axially spaced endless belts for moving the pipe longitudinally to the conveyor takeoff point. Tapered spades protrude into the spaces during the pipe return operation to eject the pipe from the conveyor. The conveyor and platform are reciprocable with respect to the second and first scissors lifts, respectively. The chassis includes pivotable arms for raising a pipe to the top of the collapsed scissors lifts so that a pipe rolls onto the conveyor belts prior to lifting. The pipe handling apparatus according to Weatherford/Lamb's Patent is a conveyor based apparatus with two stage elevation of pipe. Although the patent provides a transportable chassis, the apparatus has to be fixed prior to operation.

SUMMARY OF THE INVENTION

One aspect of the invention provides a compact pipe handling trailer for an oil and gas rig. In one embodiment, the pipe handling trailer has a structural frame having a gooseneck trailer hitch structure including a raised spaced apart frame members forming part of the gooseneck trailer hitch structure, an extended horizontal frame and a wheel and axle assembly mounted to the extended horizontal frame. A trough is provided that is tiltably and slidably connected to the extended horizontal frame, the trough having a first end and a second end. A first piston/cylinder assembly is operably coupled to the first end of the trough and a second piston/cylinder assembly is operably coupled to the trough between the first and second ends thereof. An operating station is provided including at least a seat for an operator and operating controls for the pipe handling trailer, the operating station being disposed at least partially between the raised spaced apart frame members forming part of the gooseneck trailer hitch structure.

DETAILED DESCRIPTION OF THE INVENTION

Various embodiments of the invention provide a pipe handling trailer specifically designed for handling pipes moved between the ground and the rig floor of a completion or work-over unit of an oil and gas well. The pipe handling trailer is a mobile unit that substantially reduces manpower requirements for lifting or cat line lifting of pipe and tools, while increasing safety.

Figure 1:
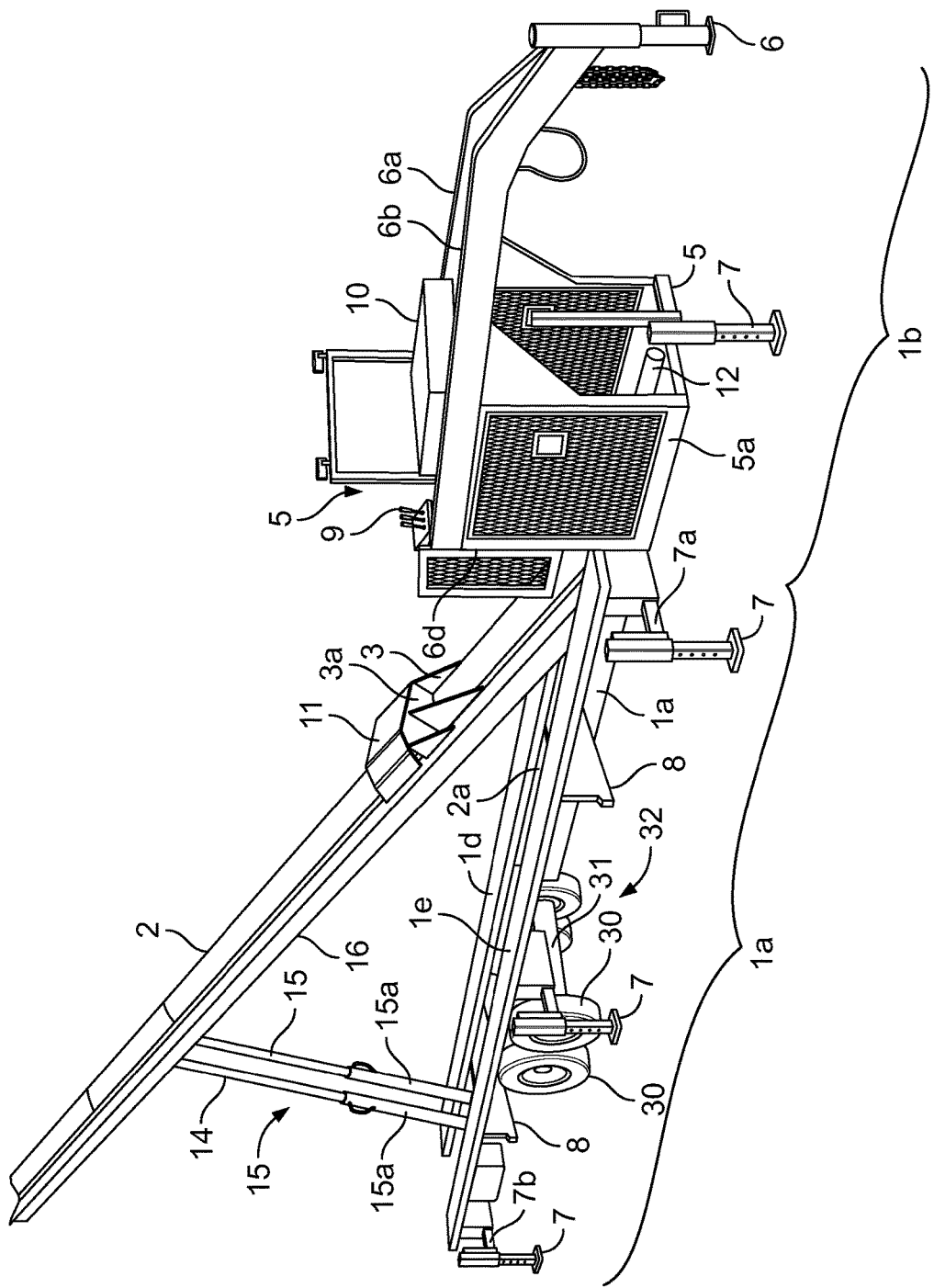
FIG. 1 shows a perspective view of a pipe handling trailer according to an embodiment of the invention.

FIG. 1 shows a perspective view of a pipe handling trailer 1 according to an embodiment of the invention. The pipe handling trailer 1 includes an extended horizontal frame portion 1a, a raised frame 1b forming part of a gooseneck extending rearwardly from the hitch end 6, and including spaced apart outside frame members 6a and 6b and vertical beam 6c and 6d that attaches the gooseneck structure to the extended horizontal frame portion 1a. In one embodiment, the extended horizontal frame portion has two horizontal side decks 1d and 1e mounted thereon.

Tilting Trough and Piston/Cylinder Assemblies

The extended horizontal frame 1a houses a tilting trough 2 between the side decks 1d and 1e. The trough 2 has a first rear end and second front end. The first or front end is pivotably on a hinge pin 13a of a hinge boss 13 that is slideably mounted to a slot (not shown) in the extended horizontal frame 1a, proximal to the raised frame 1b of the trailer 1.

Figure 8:
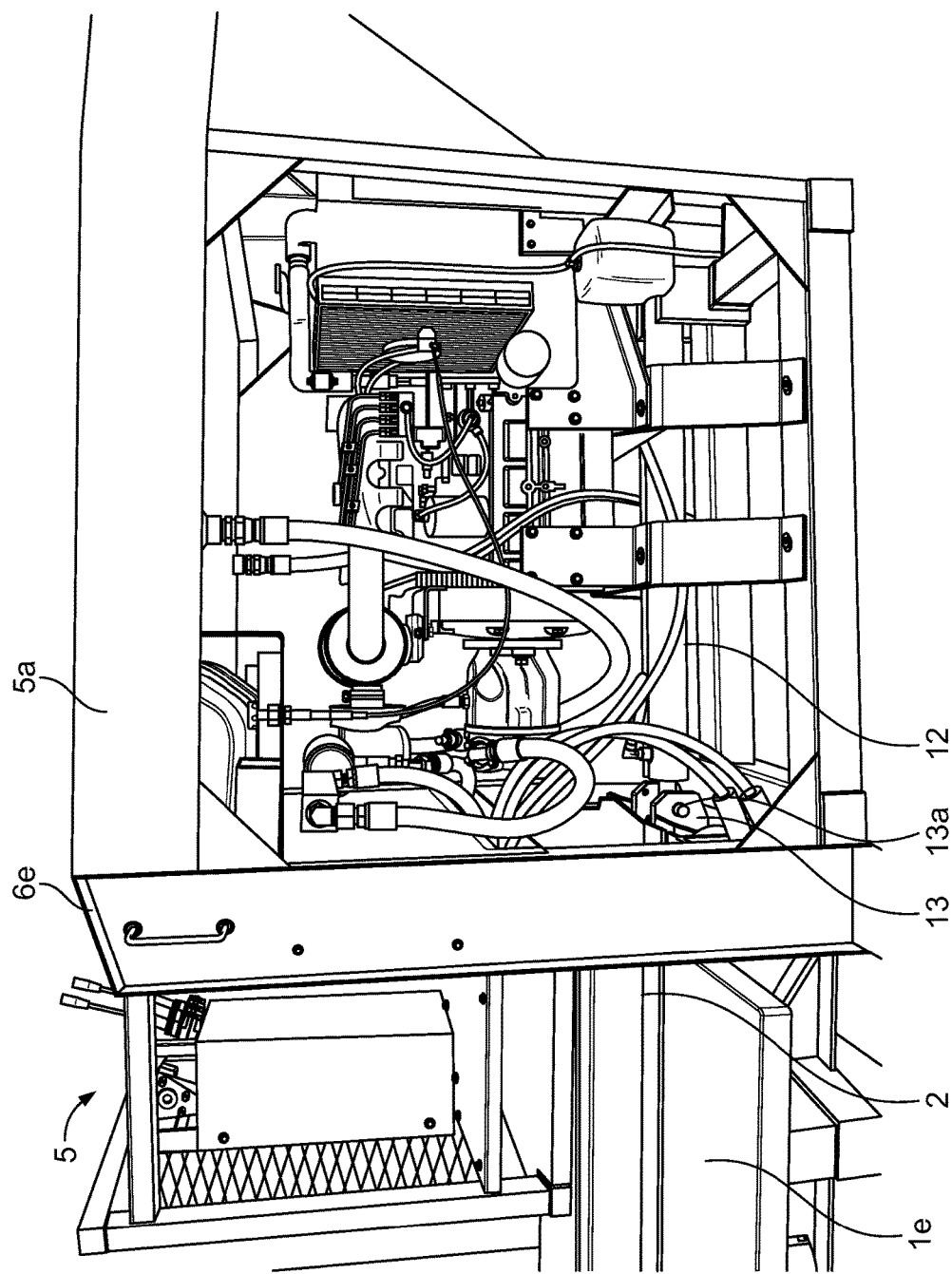
FIG. 8 is a view of the engine compartment with the cover removed to show the first piston/cylinder assembly and a view of part of the operator station.
Figure 9:
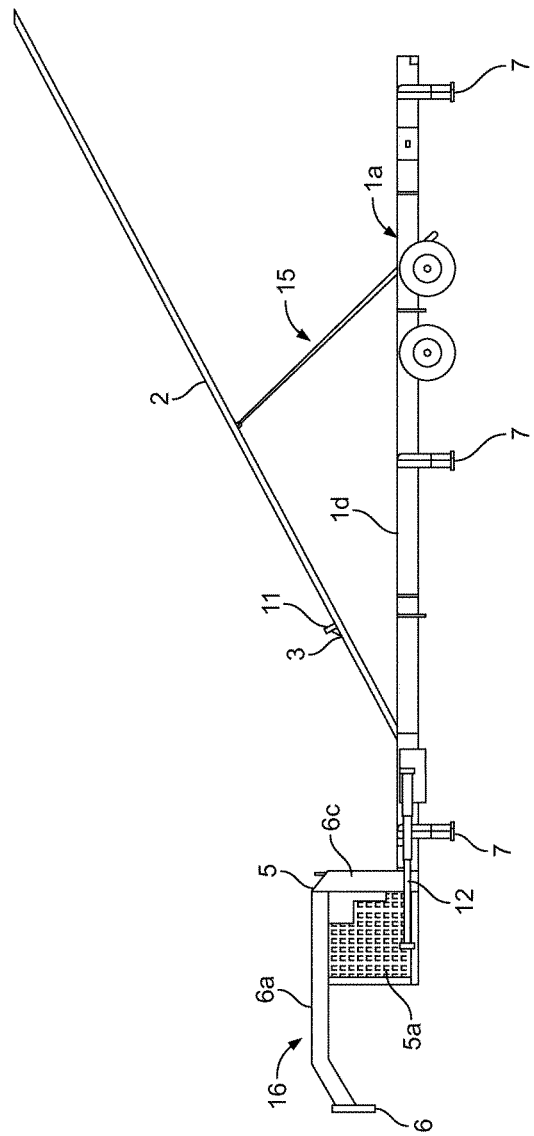
FIG. 9 is a simplified, somewhat schematic side view of the pipe handling trailer.
Figure 10:
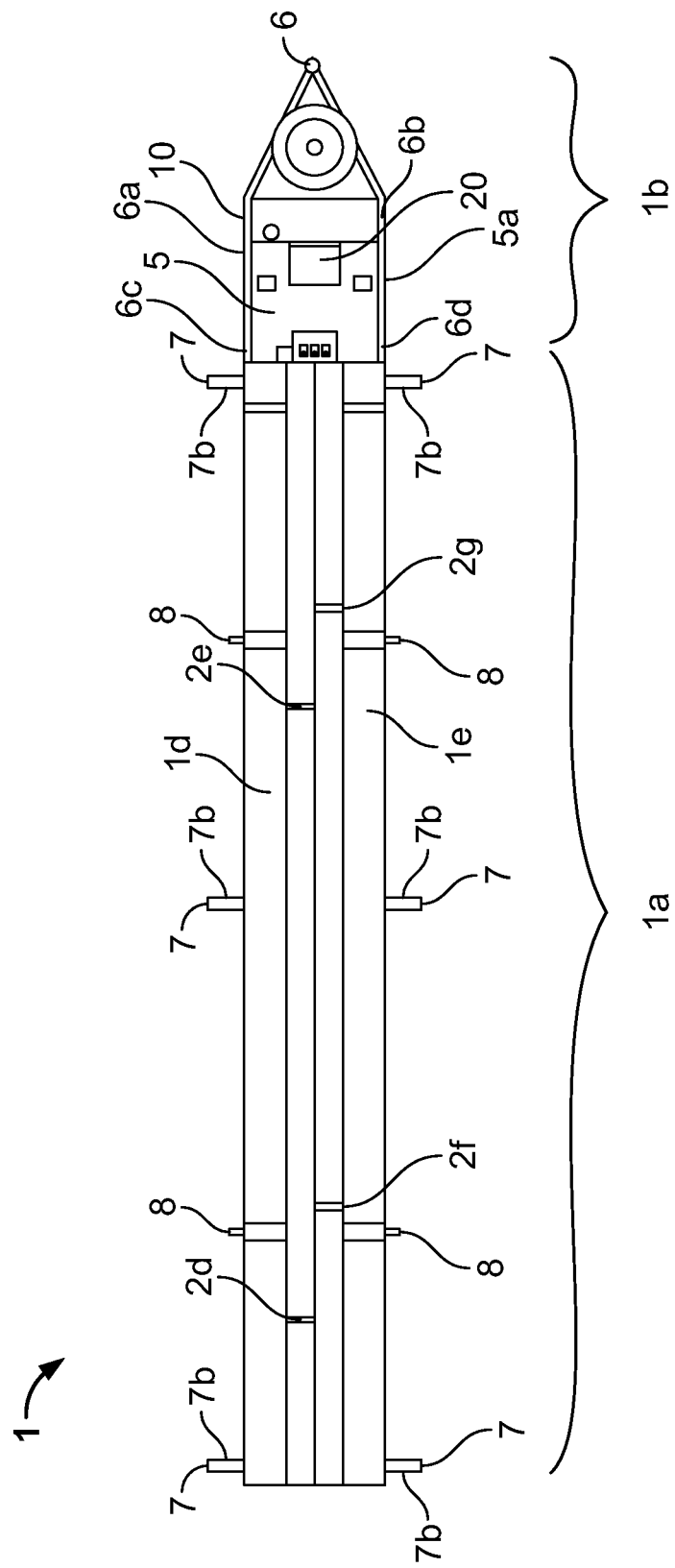
FIG. 10 is a simplified, somewhat schematic top view of the pipe handling trailer depicted in FIG. 9.

The trough 2 is coupled with a plurality of piston/cylinder assemblies 15 which, in the disclosed embodiment, is two piston/cylinder assemblies 15. A first piston/cylinder assembly 12, which is a horizontally mounted pusher piston/cylinder assembly 12, is positioned under the engine at the bottom of the hydraulic pump and engine compartment 5a, as shown in FIG. 8. The first piston/cylinder assembly 12 is coupled to the trough 2 by means of hinge pin 13a and hinge pin boss 13 that is slidably mounted to the extended horizontal frame 1a.

A second piston/cylinder assembly 15 is provided, which in one embodiment includes two rear lifting piston/cylinder assemblies 15. A top end of second piston/cylinder assembly 15 is coupled to the trough 2 at a position between the first end and the second end. In one embodiment, the top end of second piston/cylinder assembly 15 is coupled to the trough 2 at approximately a middle position on the trough 2.

In an embodiment of the invention, the hinge pins of the bosses 13, 17 and 18 form the apices of a triangle having a vertical plane, but with variable geometry (as the push piston/cylinder assembly 12 and the rear lifting cylinders 15 are raised and lowered, as described herein). Because the hinge pin 13a of slidable pin boss 13 connecting the piston end of the push cylinder/piston assembly 12 to the forward end of the trough 2 is always between a horizontal line through the pin 17 at the upper end of the rear lifting cylinder/piston assemblies 15 and above a horizontal line through the pin 18 at the lower end of the rear lifting cylinder/piston assemblies 15, even when the trough 2 is tilted to its lowest horizontal position, the three apices are never is a line; that is, the triangle is never completely "flat".

In one mode of operation, the piston of the forward horizontal cylinder/piston assembly 12 is first extended rearwardly, with the pistons 14 of the rear pair of lifting cylinders 15a of the rear lifting piston/cylinder assemblies 15 unextended, causing the front end of trough 2 to initially slide longitudinally rearward on the slidable pin boss 13. Because the lower ends of the rear lifting cylinder/piston assemblies 15 are pin mounted to the horizontal frame at a location below the horizontal plane of the trough and below the hinge pin 13a of the pin boss 13 on the forward end of the trough 2, the rear pair of lifting cylinder/piston assemblies 15, which form one of the legs of the triangle, are forced to tilt clockwise (when viewed from the left or "port" side of the trailer), lifting the mid-span of the trough 2. This causes the back end of the trough 2 to rise as the geometry of the triangle changes, and causes the trough 2 to tilt endwise counterclockwise on the pin 13a of the pin boss 13 (as viewed from the left of "port" side). Further rearward extension of the piston of the forward horizontal cylinder/piston assembly 12 causes the rear end of the trough 2 to rise further until, at maximum extension of the piston of the forward horizontal push cylinder/piston assembly 12, the rear end of the trough 2 has risen approximately 8 feet, without need for any extension of the rear pair of lifting cylinder/piston assembles 15.

In this preferred mode of operation, after the piston of the forward horizontal cylinder/piston assembly 12 has reached maximum extension, the operator can operate the controls to cause the pistons of the rear lifting piston/cylinder assemblies 15 to extend to maximum extension, which will cause the rear end of the trough 2 to rise to a maximum of approximately 18 feet. Thus, 8 feet of the rise is caused by the rearward extension of the piston of the forward horizontal cylinder/piston assembly 12 alone, and represents approximately 44.4 percent of the total amount of rise of 18 feet, which is a substantial portion of the total rise. This is desirable because, in general, the tilted trough 2 is more stable when a substantial amount of its rise results from the forward horizontal cylinder/piston assembly 12 with the pistons of the rear pair of lifting cylinder/piston assembles 15 unextended, because the cylinders of the rear pair of lifting cylinder/piston assembles 15 are stiffer when their pistons 14 are unextended.

Of course, the foregoing dimensions are exemplary only, as longer or shorter cylinders, longer or shorter pistons, and different position of the respective hinge pins will change the geometry and, thus, change how high the rear end of the tilting trough will rise, or a given length of tilting trough. Furthermore, the preferred mode of operation described above is not mandatory. In some instances, an operator may extend forward push cylinder/piston assembly 12 and the pistons 14 of rear lifting cylinder/piston assemblies 15 simultaneously, or may extend pistons 14 of the rear lifting cylinder/piston assemblies 15 first, at least partially.

Skate and Skate Guard

Figure 2:
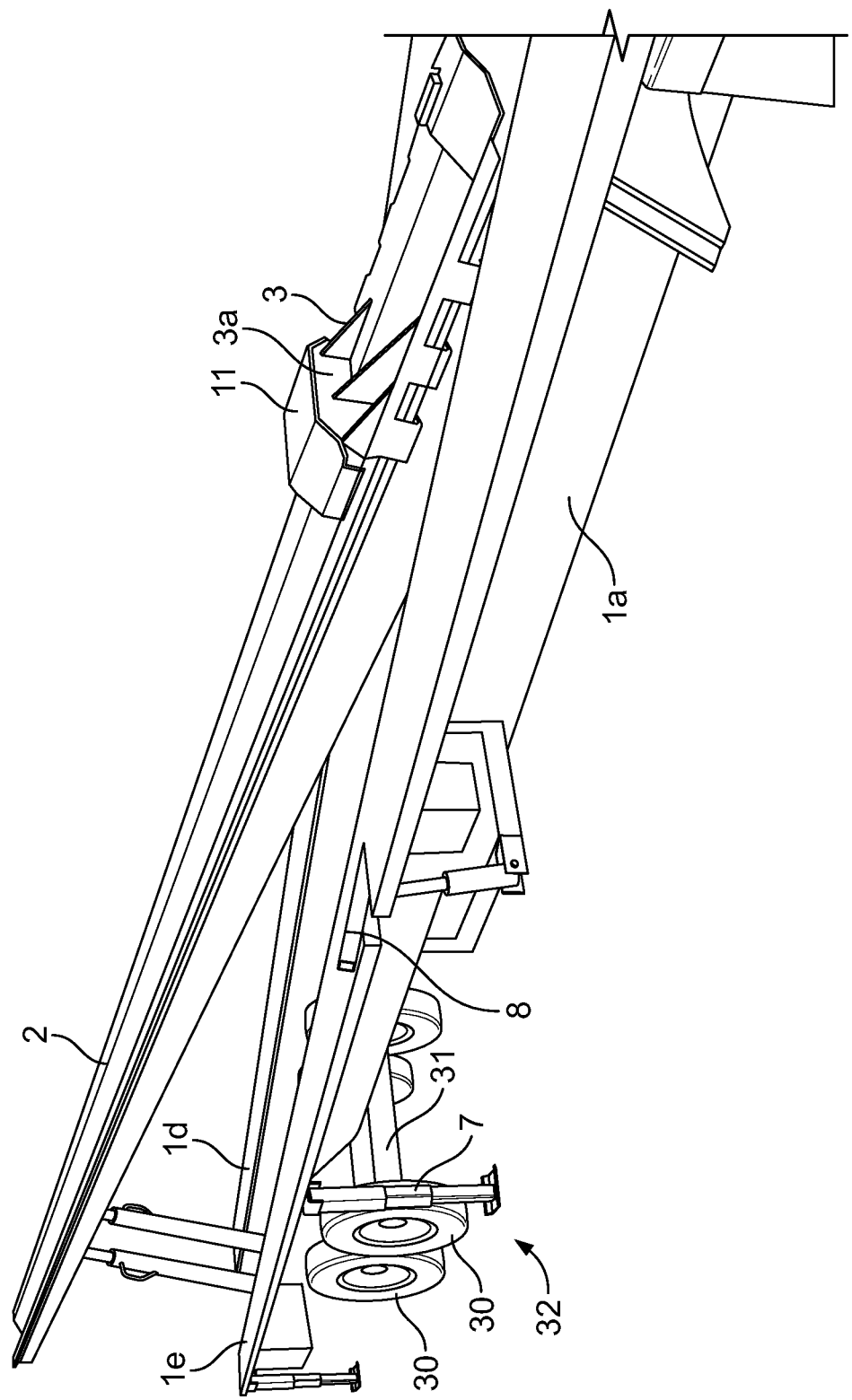
FIG. 2 shows a perspective view of a rear portion of the extended horizontal frame showing the trough partially raised with the skate and skate guard according to an embodiment of the invention.

FIG. 2 shows a perspective view of a "skate" 3 and skate guard 11 mounted on the trough 2 of the pipe handling trailer according to an embodiment of the invention. The skate 3 includes an upwardly extending plate 3a which serves as a "backstop" for the end of the pipe being handled (not shown), and a skate guard 11 disposed at the upper end of the upwardly extending plate 3a that acts as a lip extending over the end of the pipe. The skate guard 11 prevents the end of the pipe from inadvertently bouncing off of the trough 2 and over the top of the upwardly extending plate 3a, adding control and safety while handling the pipe or tubing.

In one embodiment, the skate guard 11 is disposed at a relatively low height with respect to the top of the trough 2; less than approximately two diameters of the maximum size pipe to be handled.

The low profile skate 3 and skate guard 11 requires less clearance between it and the rear portion of the operator station 5, allowing the operator station 5 to be positioned lower. In an embodiment, the rear end of the tilting trough 2 and the low profile skate 3 and skate guard 11 will fit under the vertical beams 6c and 6d supporting the rear part of the operator station 5, when the tilting trough 2 is in its horizontal and front-most extended position, with the skate 3 in its front-most position. The pin 13a of the pin boss 13 at the back end of the trough 3 can also be under the vertical beams 6c and 6d supporting the front part of the operator station 5 and hydraulic motor and engine compartment 5a This contributes to reducing the overall length of the trailer, for a given length of tilting trough 2.

Grabber Arms

A plurality of grabber arms 8 are provided on side decks 1d and 1e. Each of the side decks 1d and 1e have at least two spaced-apart grabber arms 8. The reason there are grabber arms 8 on each of the side decks 1d and 1e is so that the pipes can be rolled from either side, although only the grabber arms 8 on one of the side decks 1d and 1e will typically be used at one time. The grabber arms 8 can be folded in for transportation of the trailer to minimize transportation width and to minimize side entangling structures. The grabber arms 8 are folded out for operation after the trailer is in place.

During a roll-on operation, a pipe would first be rolled onto the grabber arms 8 when they are in a flat, down position, manually or by automated means (not shown) that are not part of the trailer. Then, the operator would operate hydraulic controls that will tilt the grabber arms 8 toward the trough, thus picking up the pipe slightly and causing it to roll into the trough 2.

The movement of the skate 3 is enabled by a control provided on the control panel of the operator chamber 5. Once the pipe is supported in the trough 2, the operator operates controls to first tilt the trough 2 to raise the rear end to the desired height of the rig. Then, the operator also operates controls to cause the skate 3 to be driven rearwardly, thus sliding the pipe rearwardly and upwardly toward the rig, where the workers on the rig pull the pipe off in a known manner.

In one embodiment of the invention, the skate 3 is driven by an endless chain drive (not show) that is disposed in the backbone 16 supporting the trough 2. In one embodiment, the chain is substantially fully enclosed in the lower frame backbone 16 supporting the trough, which saves space, reduces maintenance requirements and enhances safety.

Trough Grabber Fingers

In one embodiment, the trough 2 includes a plurality of spaced apart tilting fingers 2d, 2e, 2f and 2g on each side of the trough 2. In one embodiment, there are at least two such fingers on side of the trough 2. These spaced apart fingers 2d, 2e, 2f and 2g act in a similar manner to the grabber arms 8, but are used during roll-off operations. In roll-off operations, the workers on the rig position the end of the pipe onto the skate at the rear end of the raised tilting trough 2, with the skate 3 in its rearward position. The skate 3 will then be driven forwardly, with the end of the pipe sliding down along with it, until the pipe is independently supported by the trough 2. The trough 2 is then lowered. Once the trough 2 is fully lowered, the operator causes the spaced apart fingers 2d and 2e (or 2f and 2g) on the trough to tilt sidewise, thus picking up the pipe slightly and causing it to roll sidewise out of the trough and to roll over one of the decks, and onto a separate pipe rack for storage.

Raising Trough by Operation of Piston/Cylinders

Figure 3:
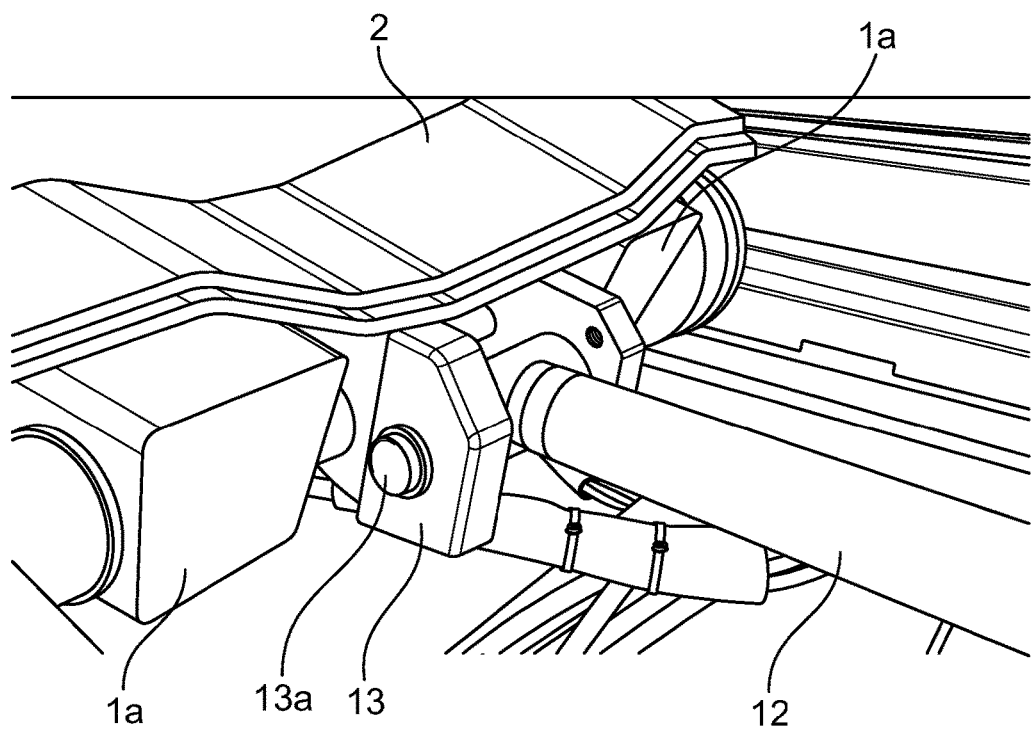
FIG. 3 shows a perspective view of the hinge pin boss mount of the first piston/cylinder assembly on the front end of the trough according to an embodiment of the invention.

FIG. 3 shows a hinge pin mount 13 and pin 13a of first piston/cylinder assembly 12 on the trough 2 according to an embodiment of the invention. The first piston/cylinder assembly 12 is coupled to the trough 2 through a hinge pin mount 13 and pin 13a. The first piston/cylinder assembly 12 is housed at the bottom of the hydraulic motor and engine compartment 5a, below the engine, and below the front of the operating station 5. The coupling arrangement of the trough 2 with the first piston/cylinder assembly 12 is also housed below the front of the operating station 5 (just under the floor where the operator's feet go). The positioning of hinge pin mount 13 and pin 13a of first piston/cylinder assembly 12 on the trough 2 underneath the front of the operating station 5 contributes to reducing the overall length of the trailer for a given length of tilting trough 2.

A first elevation of the trough 2 is achieved through the push action provided by the first piston/cylinder assembly 12 coupled to the hinge pin mount 13 of the trough 2. The cylinder of the first piston/cylinder assembly is extended through hydraulic means to create the desired push action. The pushing of the trough 2 by the first piston/cylinder assembly 12 elevates the trough 2 through the hinge mount 13 and hinge pin 13a. The first elevation of the trough 2 is at an inclination with respect to the side decks 1d and 1e. Subsequent to the first elevation, a second elevation of the trough can be achieved through the second piston/cylinder assembly 15.

Figure 4:
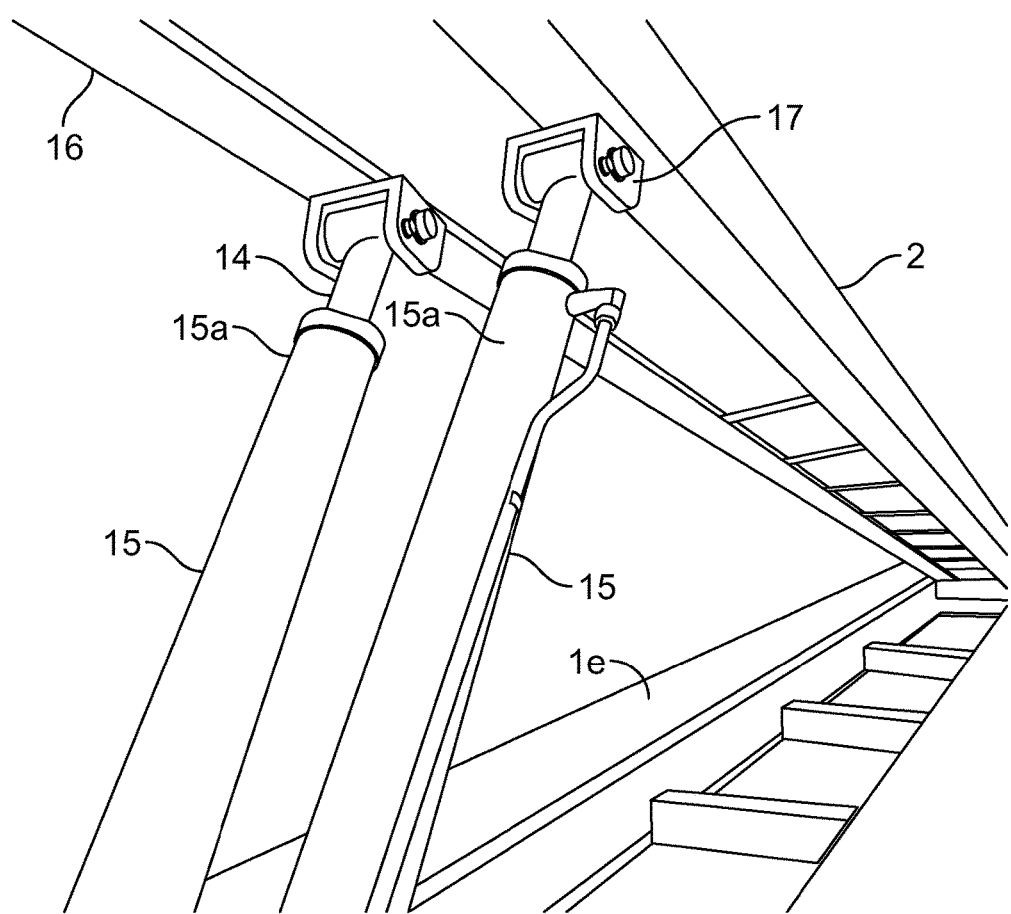
FIG. 4 shows a perspective view of the upper pin boss mount of the second piston/cylinder assembly on the midspan of the trough, with the trough partially raised, according to an embodiment of the invention.
Figure 5:
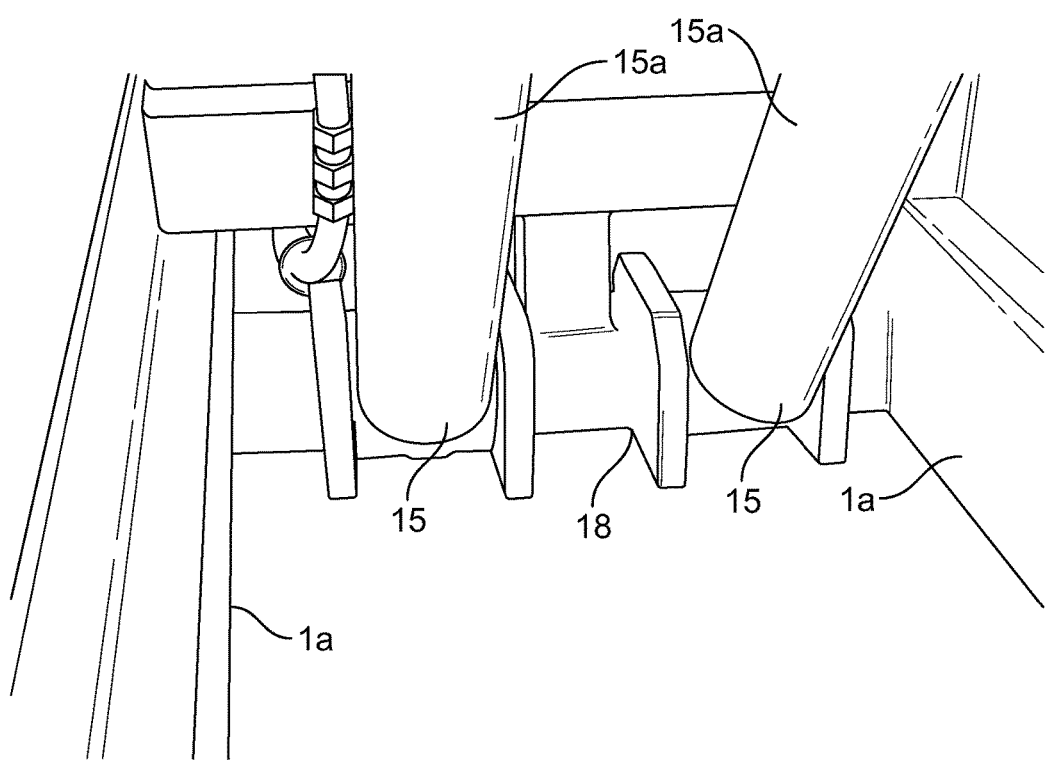
FIG. 5 shows a perspective view of the hinge pin boss mount of the lower end of the pair of second piston/cylinder assemblies on the extended horizontal frame, according to an embodiment of the invention.

FIG. 4 and FIG. 5 show the upper hinge pin mount 17 of the second piston/cylinder assemblies 15 and the lower hinge pin mount 18, respectively, according to an embodiment of the invention.

Referring now to FIG. 4, the figure shows a hinge pin mount 17 of the upper portion of the second piston/cylinder assembly 15 on the extended horizontal frame 1, according to an embodiment of the invention. The cylinders 15a are hinge mounted onto the chassis of the trailer frame or deck 1 through pin bosses 18. The upper hinge pin mount 17 of the piston/cylinder assembly 15 along with lower hinge mount 18 of the piston 14 facilitates elevation of the trough 2.

Referring now to FIG. 5, the figure shows a hinge pin mount of the second piston/cylinder assembly 15 on the trough 2. The piston/cylinder assembly 52 includes an inner piston 14 and an outer cylinder 15a. The lower end of cylinder 15a is.

Operator Station

An operator station 5 is cradled within and at least partially supported by the raised frame 1b of the extended horizontal frame 1a of trailer 1. The raised frame 1b of the extended horizontal frame 1a converges to form a hitch 6 forward of the operator station 5 and engine compartment 5a, at the frontmost end of the trailer 1. The operator station 5 is provided with a plurality of controls 9 for movement of various parts of the pipe handling trailer. The controls 9 operate the plurality of piston/cylinder assemblies that are driven by hydraulic means. A tank 10 is provided for the hydraulic pumps that power each of the piston/cylinder assemblies 12 and 15, the grabber arms 8 and other hydraulically powered equipment.

Figure 6:
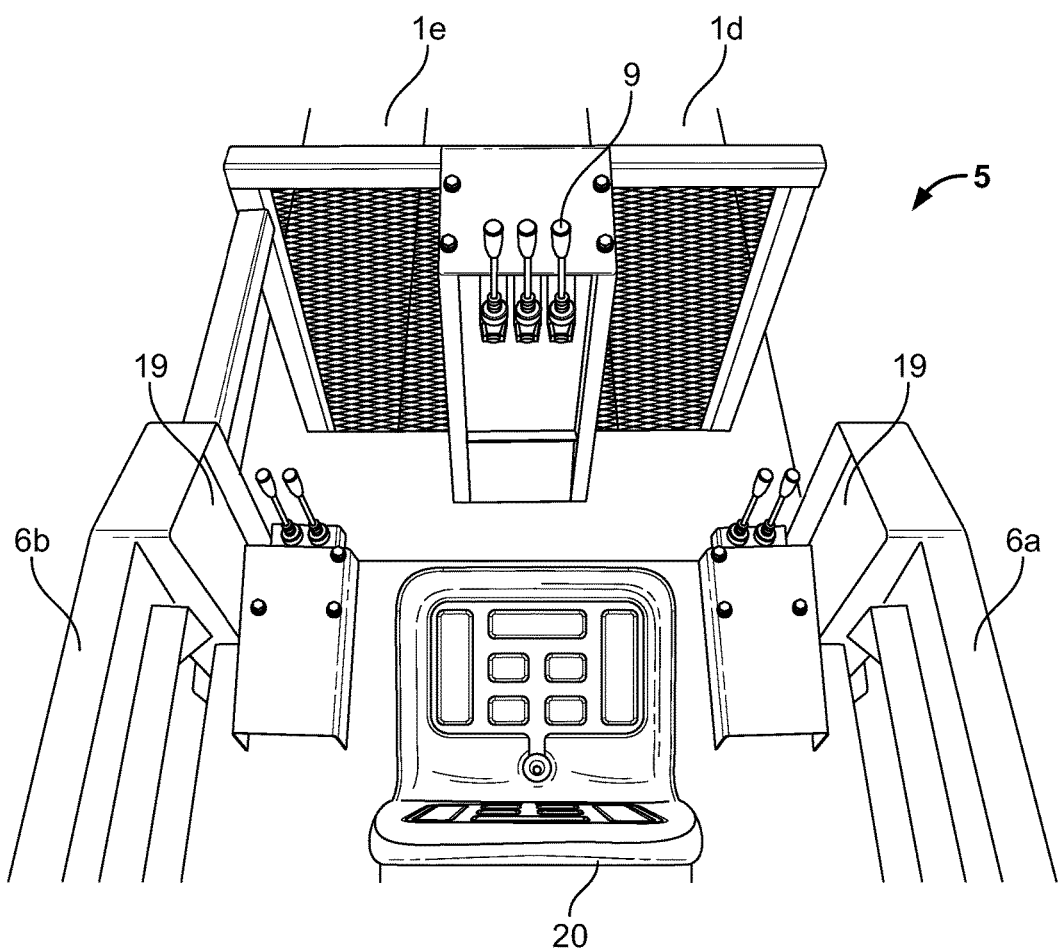
FIG. 6 shows a top, perspective view of the front portion of an operator station of the pipe handling trailer according to an embodiment of the invention.

FIG. 6 shows a top view of an operator station 5 of the pipe handling trailer 1 according to an embodiment of the invention. The operator station 5 of the pipe handling trailer 1 is constructed to sit securely between the two C-channel members 6a and 6b that form part of the gooseneck structure of the hitch 6 of the pipe handling trailer 1. The operator station 5 is disposed partially above the engine compartment 5a. In an embodiment of the invention, the operator station is cradled between and supported at least in part by the spaced apart, outside frame members of the gooseneck extending rearwardly from the hitch end.

In one embodiment, the operator station 5 is formed in a generally L-shaped space at the upper rear corner of the engine and hydraulic pump compartment 5a, with the seat 20 for the operator disposed above a portion of the engine in the engine compartment, the lower vertical leg of the "L" accommodating the operator's feet and the upper horizontal leg accommodating a seat 20 for the operator. A plurality of controls 9 are positioned conveniently in the front of the operating station 5 for operating the skate 3, the first piston/cylinder assembly 12 and the second piston/cylinder assemblies 15. Additional controls 19 are provided for operating the downriggers 7, the grabber arms 8 and other equipment.

In one exemplary form of this embodiment, the floor of the operator station (where the operator would place his or her feet) is 15" above the side decks 1d and 1e of the trailer 1 with the seat 20 mounting height 14" above the floor of the operator's station 5. The seat mounting location is the metal framing to which a standard tractor seat is fastened.

Figure 7:
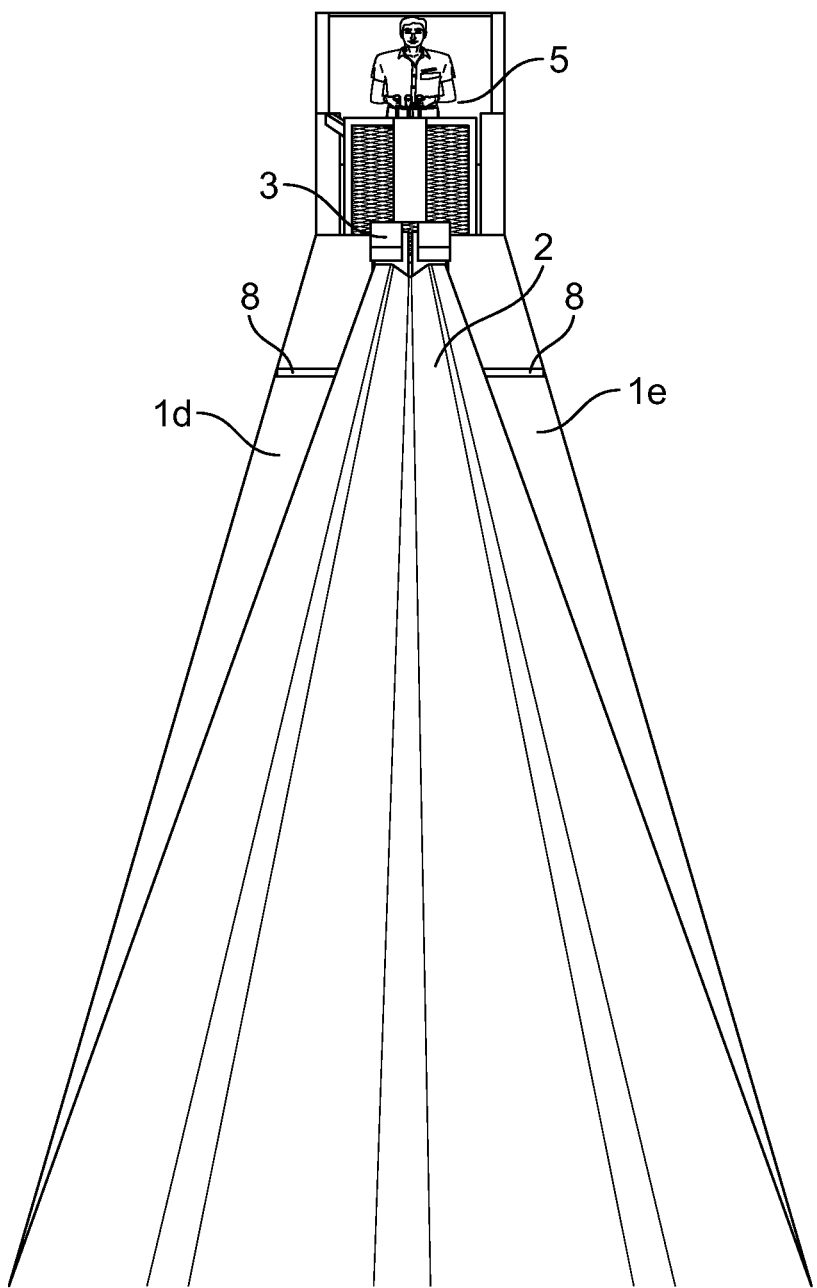
FIG. 7 shows an operator operating the pipe handling trailer according to an embodiment of the invention, as viewed from the rig floor.

Because the operator station is nestled in between the two outside framing members that make up the gooseneck of the trailer, the operator station can be positioned much lower to the ground. In an embodiment of the invention, the side decks 1d and 1e will be at a level of approximately 18 inches to two feet from the ground when in the operating position. The low positioning of the operator seat 20 within the operating station 5 facilitates easy access to the operating station 5 without the need of any side-mounted accessories, for example a multi-step ladder. The height of the operator seat allows for a non-obstructed view of the operation of the pipe handling trailer. FIG. 7 shows an operator operating the pipe handling trailer according to an embodiment of the invention, as he or she would be viewed from the rig floor.

This is a substantial improvement over prior art pipe handling trailers, which require the operator station to be position either so high above that ground that a built-in side ladder is required for access to the operator station, or have no built in operator station on the trailer at all, such that the operator must stand at the side of the trailer to conduct operations, where visibility is limited. Eliminating the built-in ladder reduces weight, cost, and decreases the overall maximum width of the trailer, allowing the trailer the invention to fit into tighter spaces and more easily avoid obstructions when being moved.

The low operator station in this embodiment of the invention also enhances safety, since the operator is close to the tilting trough that handles the pipe, but protected from it, and has no visual obstructions to any portion of the tilting trough, the trailer decks or the workmen on the rig who load and unload the pipe onto or off of the rear end of the trough. This novel feature also contributes to the pipe handling trailer in accordance with an embodiment of the invention being novel, light weight, safe and user friendly.

The low operator station also reduces the overall height of the trailer in accordance with the present invention. The lower overall height can be an important advantage at the job site or during transportation, where there may be overhead obstructions, such as overhead wires, tree limbs or the like.

Side Decks

The distance between the outside edges of the side decks 1d and 1e is in the range of about 50 inches to about 90 inches. In one example of the invention, the distance between the outside edges of the side decks 1d is between about 60 inches and 66 inches, and preferably approximately 60 inches.

In one embodiment, the horizontal side decks 1d and 1e are sufficiently wide as to allow a workman to safely stand on, or walk along either of the side decks, providing appropriate safety precautions are taken, such as locking out movement of the tilting trough. Thus, the operator of the pipe handling trailer 1 can walk along the side desk to clear a jam, remove debris, or communicate with or assist workers on the rig, without the need to step down to the ground. This both saves time and improves safety, since the ground around a rig during pipe installation and removal procedures is frequently wet, muddy, and filled with equipment and obstructions, increasing the possibility of slips and falls.

Downriggers

A plurality of downriggers 7 are provided on the outer edge of the extended horizontal frame 1a of the trailer 1. The plurality of downriggers 7 provided on the periphery of the horizontal frame 1a of the pipe handling trailer 1 facilitates easy positioning of the pipe handling trailer at any desired location. The operation of the downriggers 7 can be achieved through hydraulic means and controlled by an operator in an operating station 5.

The downriggers 7 are connected to horizontal outriggers 7b, which are slideably mounted in outrigger channels 7c attached to extended horizontal frame 1. When the trailer is to be transported, the downriggers 7 would be retracted and the outriggers 7b retracted into the outriggers channels 7c until the downriggers 7 are substantially fully underneath their respective side decks 1d and 1e. Thus, during transportation, the downriggers 7 will not substantially increase the width of the trailer, beyond the distance between the outer edges of side decks 1d and 1e. That is, the widest portion of the trailer 1 is determined by the distance between the outside edges of the twin decks, which is the same as the outer width of the spaced apart, outside gooseneck frame members 6a and 6b that both support the front end of the trailer 1 and support the hydraulic pump compartment 5a and operator station 5.

Wheel/Axle Assemblies

A pluralities of wheels 30 are mounted to one or more axles 31 to form wheel/axle assemblies 32 that are, in turn, mounted to the extended horizontal frame 1a of the pipe handling trailer 1 to enable mobility. In order to maintain the narrow width of the present invention, custom made "short" axles 31 are used, so that the axles themselves do not cause substantial widening of the maximum width of the trailer.

In one embodiment, the wheel/axle assemblies 32 are relatively permanently affixed to the trailer 1. The integration of the wheel assembly 32 as relatively permanently attached wheel/axle assembly that need not be removed for operation of the pipe handling trough, facilitates rapid positioning of the trailer 1 at any desired location without elaborate initial arrangements. This is a significant improvement over pipe handling apparatuses known to exist in the prior art. This is important in workovers and completions, which involve a large number of highly paid workers and expensive equipment, the standby time for which can be hundreds or thousands of dollars per hour.

Compact Design and Light Weight of Trailer

The novel design of the pipe handling trailer 1 in accordance with an embodiment of the present invention, including the operator station 5 cradled between the rearwardly extending frame members 6a and 6b of the gooseneck, and other features of the invention, including eliminating the need for a multi-step stairway at the side, contribute to the narrow width and lighter weight of a trailer 1 in accordance with the present invention.

In one embodiment of the trailer 1 of the present invention, maximum width of the trailer is approximately 5' feet. In another embodiment, the width can be up to 5' 6" wide. In still another embodiment, the width can be wider, up to 102 inches wide.

The design of the present invention in one embodiment provides a compact, narrow, lightweight trailer 1 that is free from large changes in width from the engine compartment 5a at the front to the rear end of the trailer 1, and is relatively free from large entangling structures, such as side stairways or the like. The narrow and relatively constant width of the trailer 1, and the substantial absence of large side mounted appendages prone to entanglement, in accordance with an embodiment of the present invention, greatly facilitates transportation and maneuverability of the trailer 1. In drilling areas, there are frequently many obstructions, including vehicles, equipment, trees and personnel that must be avoided when moving the trailer into position. The narrow overall width also reduces the storage footprint when the trailer is not in use.

An important advantage of cradling the operator station 5 between and supported at least in part by the spaced apart, outside frame members 6a and 6b of the gooseneck extending rearwardly from the hitch end 6 is that it increases the length of the tilting trough for a given total length of the trailer.

Because the length of the tilting trough 2 is an important parameter for determining the maximum degree of rise of the end of the tilting trough during tilting (longer being better), but the overall length of the trailer 1 limits maneuverability and increases weight, a lower ratio of the overall length of the trailer divided by the length of the tilting trough is desirable. In accordance with the invention, it is preferred that this ratio be less than 1.45, and preferably less than 1.4 and most preferably less than 1.35, since greater ratios limit the maneuverability of the trailer 1 and increases overall trailer weight and cost.

For example, in a prior art trailer, having an overall length (from hitch to the rear end of the trailer of approximately 49' 6" (49.5'), the tilting trough is 34', representing a ratio of approximately 1.456 total trailer length divided by tilting trough length. By contrast, in the present invention, the cradling of the operator station permits the tilting trough to be approximately 38' long in one embodiment of similar overall hitch to the rear end length; 49' 7" (49.583'), representing a ratio of approximately 1.305 total trailer length divided by tilting trough length. This is a substantial improvement over art pipe handling trailers.

The various features of the invention described herein also contribute to lowering the overall weight for a given length of tilting trough 2. The weight of trailer 1 resulting from design in accordance with the present invention in one embodiment is less than 15,000 pounds, and preferably approximately 14,000 pounds, which is sufficiently low that the trailer can be pulled with an ordinary ¾ ton pick up truck. Pulling a 14,000 load with a ¾ ton pick up truck does not require a commercial driver's license (CDL). This greatly reduces manpower costs.

The reduced weight in the present invention permits use of two, 8,000 pound capacity axles 31 instead of the two, 10,000 pound capacity (or higher) axles in accordance with prior art trailers. The lighter weight also contributes to increased maneuverability at the rig site and reduces the possibility of the trailer becoming stuck in mud.

Because overall trailer weight limits maneuverability and increases cost, it is desirable to have the smallest values of trailer overall weight for a given length of tilting. The novel design of the trailer of the present invention accomplishes a substantial improvement over the prior art in terms of favorable ratios of overall weight for a given length of tilting trough.

The relative lightness of the overall weight of the trailer 1 can be expressed as a ratio of the overall weight of the trailer divided by the length of the tilting trough. For comparison, one prior art trailer has a weight of approximately 14,400 pounds for a tilting trough length of approximately 34', representing a ratio of 423.5. In accordance with the invention, it is preferred that this ratio be less than 420, and preferably less than 400 and most preferably less than 370, because greater ratios increase make it unlikely that the trailer can be pulled by ¾ ton pick up truck, and increase the likelihood of the trailer becoming stuck in mud at the job site. In one embodiment of the present invention, however, the overall weight of the trailer is approximately 14,000 pounds for a tilting trough length of approximately 38' long, which represents a ratio of approximately 368.4 pounds per foot of tilting trough length or less (smaller being better). This is a substantial improvement over prior art pipe handling trailers. The foregoing description of the invention has been set for merely to illustrate the invention and is not intended to be limiting. Since modifications of the disclosed embodiments incorporating the spirit and substance of the invention may occur to person skilled in the art, the invention should be construed to include everything within the scope of the appended claims and equivalents thereof.

The pipe handling trailer described herein is specifically adapted for completions and/or workovers, which limits the required carrying capacity of the pipe handling trailer to about 2,000 pounds. The lower weight of the pipe handling trailer facilitates better handling of the apparatus during transit.

The invention provides a pipe handling trailer for an oil and gas rig, wherein the pipe handling trailer is a portable apparatus and is part of a trailer. The pipe handling trailer effectively combines pivot lift and hydraulic lift to elevate the pipe handling trailer to various desired heights. The width of the pipe handling trailer and the weight of the pipe handling trailer enable easy maneuverability and handling of the pipe handling trailer during transit.

The foregoing description of the invention has been set for merely to illustrate the invention and is not intended to be limiting. Since modifications of the disclosed embodiments incorporating the spirit and substance of the invention may occur to person skilled in the art, the invention should be construed to include everything within the scope of the appended claims and equivalents thereof.

What is claimed is:

1. A compact pipe handling trailer for a pulling unit, the pipe handling trailer comprising:
   a. a trailer frame having gooseneck trailer hitch structure, a raised spaced apart frame members forming part of the gooseneck trailer hitch structure, an extended horizontal frame and a wheel and axle assembly mounted to the extended horizontal frame;

b. a trough tiltably and slidably connected to the extended horizontal frame, the trough having a first end and a second end;

c. a first piston/cylinder assembly operably coupled to the first end of the trough;

d. a second piston/cylinder assembly operably coupled to the trough between the first and second ends thereof; and e. an operating station including at least a seat for an operator and operating controls for the pipe handling trailer, said operating station being disposed at least partially between the raised spaced apart frame members forming part of the gooseneck trailer hitch structure;

wherein the first piston/cylinder assembly is configured to cause a substantial rise in elevation of the rear end of the trough, when generating a push action alone, by means of rotation of the second piston/cylinder assembly, independent of extension of a piston of the second piston/cylinder assembly, wherein the first piston/cylinder assembly has a hinge pin, wherein the second piston/cylinder assembly has an upper hinge pin and a lower hinge pin;

wherein the first, second and third hinge pins form the apices of a triangle in a vertical plane during normal operation, and wherein the first, second and third hinge pins are configured so as to never be in a line during normal operation.

2. The pipe handling trailer according to claim 1, wherein the extended horizontal frame includes horizontal side decks on each side of the trough, the side decks having outside edges, the distance between the outer edges of the side decks substantially defining the maximum width of the trailer.

3. The pipe handling trailer according to claim 2, wherein the width between the outer portions of the side raised spaced apart frame members forming part of a gooseneck trailer hitch structure is not substantially greater than the distance between the outer edges of the side decks.

4. The pipe handling trailer according to claim 2, wherein the distance between the outer edges of the side decks is in the range of about 50 inches to about 90 inches.

5. The pipe handling trailer according to claim 1, wherein the width of the deck is preferably in the range of between about 60 inches and 66 inches.

6. The pipe handling trailer according to claim 1, wherein the trough comprises of a skate for releasably retaining a pipe and configured for a two way longitudinal movement along the trough.

7. The pipe handling trailer according to claim 1, wherein the first end of the trough is pin mounted to a slidable boss that is slidable along at least part of the length of the extended horizontal frame.

8. The pipe handling trailer according to claim 1, wherein the first piston/cylinder assembly is positioned below the operating means and ahead of the pivot, the pivot configured for pushing the trough at the pivot point to rise to a predefined height.

9. The pipe handling trailer according to claim 1, wherein the second piston/cylinder assembly has a first end and a second end, the first end is pin mounted to the trough and the second end is pin mounted to the extended horizontal frame.

10. The pipe handling trailer according to claim 1, wherein the position of the pin mount of the upper end of the second piston/cylinder assembly to the trough is preferably a position approximately in the middle of the trough between the first end of the trough and the second end of the trough.

11. The pipe handling trailer of claim 1, wherein a further elevation of the trough is achieved through the extension of a piston of the second piston/cylinder assembly.

12. The pipe handling trailer according to claim 1, wherein the action of the first piston/cylinder assembly initiated by hydraulic means, and wherein the action of the second piston/cylinder assembly is initiated by hydraulic means.

13. The pipe handling trailer according to claim 1, wherein the operating station forms a generally L-shaped station at the rear and upper portion of the hydraulic pump and engine compartment, the station comprising of a. a seat for an operator;

b. a plurality of controls for the operation of the pipe handling trailer; and c. an inset step at the lower portion of the operator station.

14. The pipe handling trailer according to claim 13, wherein the seat for the operator is sufficiently low to the ground to permit an operator to step into it from the ground with a single step.

15. The pipe handling trailer according to claim 1, wherein the pipe handling trailer is provided with a plurality of downriggers for positioning the pipe handling trailer proximal to a driller rig, wherein the downriggers are attached to outriggers, the outriggers being slideably mounted in channels attached to the extended horizontal frame, the outriggers being retractable into the channels such that the downriggers are retractable substantially fully underneath the side decks.

16. The pipe handling trailer according to claim 15, wherein each of the downriggers is operated by hydraulic means.

17. The pipe handling trailer according to claim 1, wherein the axle and wheel assembly is relatively permanently attached such that it need not be removed for operable movement of the trough.

18. The pipe handling trailer according to claim 15, wherein the downriggers provided with hydraulic means for positioning the pipe handling trailer firmly at a desired location.

19. A pipe handling trailer for a drilling or service rig, the pipe handling trailer comprising:

a. a trailer frame having gooseneck trailer hitch structure, a raised spaced apart frame members forming part of the gooseneck trailer hitch structure, an extended horizontal frame and a wheel and axle assembly permanently mounted to the extended horizontal frame;

b. a trough tiltably and slidably connected to the extended horizontal frame, the trough having a first end and a second end;

c. a first piston/cylinder assembly operably coupled to the first end of the trough;

d. a second piston/cylinder assembly operably coupled to the trough between the first and second ends thereof, wherein the second piston/cylinder assembly includes a pair of lifting cylinders; and e. an operating station including at least a seat for an operator and operating controls for the pipe handling trailer, said operating station being disposed at least partially between the raised spaced apart frame members forming part of the gooseneck trailer hitch structure, wherein the first end of the trough is pin mounted to a slidable boss that is slidable along at least part of the length of the extended horizontal frame, wherein the first piston/cylinder assembly is configured to cause a substantial rise in elevation of the rear end of the trough, when generating a push action alone, by means of rotation of the second piston/cylinder assembly, independent of extension of a piston of the second piston/cylinder assembly;

wherein the first piston/cylinder assembly has a hinge pin, wherein the second piston/cylinder assembly has an upper hinge pin and a lower hinge pin, wherein the first, second and third hinge pins form the apices of a triangle in a vertical plane during normal operation, and wherein the first, second and third hinge pins are configured so as to never be in a line during normal operation.

20. The pipe handling trailer for a drilling or service rig of claim 19, wherein the lower ends of the rear lifting cylinder/piston assemblies are pin-mounted to the horizontal frame at a location below the horizontal plane of the trough and below a hinge pin of the slidable boss.

21. A pipe handling trailer for a drilling or service rig, the pipe handling trailer comprising:
   a. a trailer frame having gooseneck trailer hitch structure, a raised spaced apart frame members forming part of the gooseneck trailer hitch structure, an extended horizontal frame and a wheel and axle assembly mounted to the extended horizontal frame;
   b. a trough tiltably and slidably connected to the extended horizontal frame, the trough having a first end and a second end;
   c. a first piston/cylinder assembly operably coupled to the first end of the trough;
   d. a second piston/cylinder assembly operably coupled to the trough between the first and second ends thereof, wherein the second piston/cylinder assembly includes a pair of lifting cylinders, and
   e. an operating station including at least a seat for an operator and operating controls for the pipe handling trailer, said operating station being disposed at least partially between the raised spaced apart frame members forming part of the gooseneck trailer hitch structure; and
   f. a means for rising an elevation of the rear end of the trough by means of rotation of the second piston/cylinder assembly alone independent of extension of a piston of the second piston/cylinder assembly, wherein the first piston/cylinder assembly has a hinge pin, wherein the second piston/cylinder assembly has an upper hinge pin and a lower hinge pin, wherein the first, second and third hinge pins form the apices of a triangle in a vertical plane during normal operation, and wherein the first, second and third hinge pins are configured so as to never be in a line during normal operation.

* * * * *